United States Patent Office 3,444,132
Patented May 13, 1969

3,444,132
PROCESS FOR HARDENING A LIQUID EPOXY RESIN WITH AN ACID HARDENER IN PRESENCE OF A CARBOXYLIC ACID AMIDE
Heinz Noeske, Oberhausen-Sterkrade Nord, Hans Feichtinger, Dinslaken, and Hanswerner Linden, Oberhausen-Holten, Germany, assignors to Ruhrchemie Aktiengesellschaft, Oberhausen-Holten, Germany, a corporation of Germany
No Drawing. Filed June 9, 1965, Ser. No. 462,740
Claims priority, application Germany, June 16, 1964, R 38,141
Int. Cl. C08g 23/22, 51/80
U.S. Cl. 260—47                                    9 Claims

ABSTRACT OF THE DISCLOSURE

A process is disclosed for hardening a liquid epoxy resin. The process involves reacting such a resin, an acid hardening agent and more specifically a polycarboxylic acid anhydride and a tertiary carboxylic acid amide having the formula:

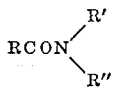

wherein each of R, R' and R" designate aliphatic hydrocarbon radicals as accelerator for the said reaction. The resulting resins which are novel are characterized by outstanding mechanical and physical properties.

---

The present invention relates to a process for cross-linking compounds containing epoxide groups. More specifically, this invention relates to a process for hardening liquid polyglycidyl ethers with mixtures of acidic hardening agents and a novel accelerator comprising liquid tertiary carboxylic acid amides.

It is known in the art to convert compounds with one or several epoxy groups to solid epoxy resins with the aid of acid or basic hardening agents. Acid hardening agents include acid anhydrides, such as maleic acid anhydride, malonic acid anhydride, phthalic acid anhydride as well as derivatives thereof with partially or completely hydrogenated aromatic ring systems, e.g., tetra- or hexahydro-phthalic acid anhydride. Stoichiometric amounts of a single compound as well as mixtures of several compounds of the above-mentioned group are reacted with polyglycidylethers. Hitherto, valuable casting resins were only obtainable from solid polyglycidylethers.

If epoxy compounds of low epoxide equivalent weight are hardened with acid hardening agents, as for instance liquid polyglycidylethers obtained by reaction of epichlorohydrin with 2,2-bis[4-hydroxyphenyl]-propane, the hardening process takes place over comparatively long times of up to 15 hours at 160° C. The extended hardening times cause considerable losses of the acid hardening agent due to sublimation, so that the original ratio of epoxy compounds to hardening agent no longer prevails in the end product. This leads to products with deficient physical properties as well as to deformation and crack growth.

It is known that the hardening time of the above mentioned mixtures of polyglycidyethers and hardening agents may be reduced by addition of accelerators, for instance, adducts of phenols or amines with BF$_3$, or compounds with reactive hydrogen atoms, i.e., alcohols, phenols and mercaptans as β-thiodiglycole, as well as carboxylic acid amides as for instance formamide, acetamide, benzamide or urea.

In the case of compounds with reactive hydrogen atoms, the acceleration of the reaction results obviously from the reactive hydrogen entering into the course of the poly-addition reaction.

Many of these accelerators cause discoloration of the end products or, as for instance urea, result in opaque products due to their poor solubility. In certain cases, inhomogenous casting resins are obtained resulting from segregation of the hardening accelerator, leading to products with poor mechanical properties, as for instance flexural, compressive and tensile strength. Generally, casting resins prepared in the above-described manner have Martens temperatures of 80° C. and flexural strengths below 1000 kp./cm.$^2$.

It is therefore an object of the invention to overcome these and other difficulties encountered in the prior art and to provide accelerators which reduce the cure time of epoxide resins admixed with hardening agents. Other objects are to obtain products with good physical properties and to provide liquid accelerators which facilitate handling, mixing and casting of epoxide resins.

These and other objects are attained by using an accelerator comprising at least one liquid tertiary carboxylic acid amide corresponding to the general formula:

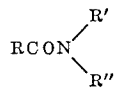

to harden compounds having epoxide groups, preferentially liquid polyglycidylethers admixed with acid hardening agents. In the above formula R, R' and R" represent equal or different aliphatic hydrocarbon radicals. Compounds wherein R, R' and R" contain 4 to 18, preferentially 4 to 13 carbon atoms are especially suited. Polyglycidyl ethers having epoxy equivalent weights of 180 to 300 are especially well suited.

Besides the considerable acceleration effect an improvement of the physical properties is obtained, especially an increase of the Martens temperature or heat-resistance, until values up to and above of 120° C. are obtained. The gel time serves as standard for the acceleration effect, and signifies the time after which the surface of a cast resin shows no impression after touching it with a wire and after which no resin adheres to the wire.

Similar results are obtained on hardening of other polyglycidylethers with the process according to the invention. Greater or lesser than stoichiometric quantities of anhydride, for instance the stoichiometric quantity ±10% thereof, may be used.

The effect of the tertiary carboxylic acid amides used as accelerators according to the invention is unexpected, since, in view of earlier studies, it was generally believed that the reaction of epoxy compounds is catalyzed by compounds capable of forming hydrogen bridges, c.f. Houben-Weyl, Methoden der organischen Chemie, vol. 14/2, 4th edition, Stuttgart 1963, 512 and 519.

The process according to the invention demonstrates that tertiary carboxylic acid amides are superior to the compounds containing reactive hydrogen atoms.

The said tertiary carboxylic acid amides are applied in amounts of 0.1 to 20 percent by weight depending upon the amount of resin, according to the desired effect.

The gel time depends upon the added amount of the tertiary carboxylic acid amide.

According to the invention, clear, transparent casting resins are obtained.

The following non-limiting examples are given by way of illustration as certain preferred embodiments of the invention and are not to be construed as narrowing the broad scope of the novel accelerators and method for using the same.

The examples of Table I illustrate the accelerating effect and the improvement of the physical properties of epoxide resins. The examples are prepared by hardening a commercially available liquid epoxy resin obtained by reacting epichlorhydrin with 2,2-bis-[4-hydroxyphenyl]-propane having an epoxide equivalent weight of 190, with phthalic acid anhydride and increasing amounts of N,N-diisononyl-isononanic acid amide.

For the determination of the data of Table I, a mixture of the commercially available liquid polyglycidylether having an epoxy equivalent weight of 190 and a stoichiometric amount of phthalic acid anhydride are mixed with 2 percent β-thiodiglycol (since a comparable resin could only be obtained by addition of an accelerator) and with increasing amounts of a tertiary carboxylic acid amide, namely N,N-diisononyl-isononanoic acid amide. The mixtures so obtained are cast in iron molds having the dimensions 130 x 130 x 18 mm. and hardened for six hours at 160° C.

The physical data listed in Table I and the other tables of examples is obtained according to the following test methods:

Tensile strength and extension—DIN 53 455
Flexural strength and deflection—DIN 53 452
Impact strength—DIN 53 453
Ball indentation—DIN 53 456
Heat-resistance (Martens temperature)—DIN 53 462

The quantity of accelerator added is based on the amount of epoxide resin present in the composition.

a primary, secondary and tertiary carboxylic acid amide respectively are compared.

The values listed in Tables III to VI are obtained by testing plates of 130 x 130 x 18 mm., which are cast from stoichiometric mixtures of a polyglycidylether and phthalic acid anhydride with addition of 2 percent of the carboxylic acid amides named in the said tables respectively and maintained at a temperature of 160° C. for 6 hours. The polyglycidylether is the same resin as employed in the preparation of the examples of Table I. The gel time signifies the time after which the surface of a cast resin shows no impression after touching it with a wire and after which no resin adheres to the wire.

TABLE III

| Example No. | | Gel time in minutes |
|---|---|---|
| 16 | without addition | 310 |
| 17 | isobutyric acid amide | 100 |
| 18 | N-isononyl-isobutyric acid amide | 130 |
| 19 | N,N-diisononyl-isobutyric acid amide | 35 |

TABLE IV

| Example No. | | Gel time in minutes |
|---|---|---|
| 20 | Without addition | 310 |
| 21 | Isooctanoic acid amide | 104 |
| 22 | N-isononyl-isooctanoic acid amide | 132 |
| 23 | N,N-diisononyl-isooctanoic acid amide | 15 |

TABLE I.—PHYSICAL PROPERTIES OF RESINS OBTAINED BY HARDENING A COMMERCIALLY AVAILABLE LIQUID EPOXY RESIN WITH PHTHALIC ACID ANHYDRIDE AND AN ACCELERATOR

| Accelerator | β-thiodiglycol | N,N-diisononyl-isononanoic acid amide | | | | | | |
|---|---|---|---|---|---|---|---|---|
| Example No. | 1 | 2 | 3 | 4 | 5 | 6 | 7 | 8 |
| Addition in percent by weight, depending upon the amount of resin | 2 | 1 | 2 | 2.5 | 3 | 5 | 10 | 20 |
| Tensile strength (kp./cm.²) | 528 | 602 | 655 | 878 | 637 | 690 | 630 | 740 |
| Flexural strength (kp./cm.²) | 930 | 1,530 | 1,630 | 1,640 | 1,720 | 1,570 | 1,310 | 1,230 |
| Extension (percent) | 5.7 | 6.4 | 7.4 | 9.0 | 7.0 | 7.4 | 6.1 | 8.6 |
| Deflection (mm.) | 5.0 | 9.3 | 11.2 | 9.6 | 11.6 | 11.8 | 9.3 | 8.6 |
| Impact strength (kp. cm./cm.²) | 8 | 13 | 12 | 20 | 11 | 15 | 14 | 19 |
| Ball indentation after 10 sec. (kp./cm.²) | 1,462 | 1,516 | 1,540 | 1,450 | 1,515 | 1,405 | 1,450 | 1,320 |
| Ball indentation after 60 sec. (kp./cm.²) | 1,398 | 1,470 | 1,495 | 1,385 | 1,450 | 1,385 | 1,410 | 1,300 |
| Heat-resistance (Martens temperature) °C | 67 | 116 | 120 | 123 | 116 | 112 | 91 | 85 |
| Gel time (min.) | 40 | 45 | 20 | 20 | 19 | 17 | 1 | <1 |

The test values given in Table I illustrate that an addition of the tertiary carboxylic acid amide according to the invention in the range of 1 to 10 percent by weight yields resins with very good mechanical properties. Addition of 1 to 5 percent by weight appears especially favorable.

The examples listed in Table II comprise a comparison between the heat-resistance of an epoxy resin having an epoxy equivalent weight of 190 hardened with phthalic acid anhydride and increasing amounts of an accelerator known in the art, on one hand, and of N,N-diisononyl-isononanoic acid amide according to the invention on the other. The same epoxide resin is used and test plates prepared as described for the examples listed in Table I.

TABLE II

| Example No. | 9 | 10 | 11 | 12 | 13 | 14 | 15 |
|---|---|---|---|---|---|---|---|
| Addition in percent by weight, depending upon the amount of resin | 1 | 2 | 2.5 | 3 | 5 | 10 | 20 |
| Heat-resistance (° C.) with addition of β-thiodiglycol (Martens temperature) | 83 | 70 | 76 | 68 | 63 | 55 | |
| Heat-resistance (° C.) with addition of N,N-diisononyl-isononanoic acid amide (Martens temperature) | 116 | 120 | 123 | 116 | 112 | 91 | 85 |

The process according to the invention demonstrates that tertiary carboxylic acid amides are accelerators superior to those containing reactive hydrogen. This is illustrated by the examples in Tables III to VI, wherein gel times of polyglycidylether-phthalic acid anhydride-mixtures both with and without addition of equal amounts of

TABLE V

| Example No. | | Gel time in minutes |
|---|---|---|
| 24 | Without addition | 310 |
| 25 | Isononanoic acid amide | 180 |
| 26 | N-isononyl-isononanoic acid amide | 107 |
| 27 | N,N-diisononyl-isononanoic acid amide | 20 |

TABLE VI

| Example No. | | Gel time in minutes |
|---|---|---|
| 28 | Without addition | 310 |
| 29 | Isotridecanoic acid amide | 112 |
| 30 | N-isononyl-isotridecanoic acid amide | 118 |
| 31 | N,N-diisononyl-isotridecanoic acid amide | 42 |

From the above data, it is evident that optimal gel times are obtained according to the invention by using tertiary carboxylic acid amides as accelerators.

N,N-diisononyl-isononanoic acid amide proves to be especially suitable. Even the addition of an amount of only 1 percent by weight thereof results in a decrease of the gel time to 45 minutes, while the addition of 2 percent by weight decreases the gel time to 20 minutes, and on addition of up to 10 or up to 20 percent by weight gelation occurs after one minute or less than one minute.

The manufacture of the tertiary carboxylic acid amides used, according to the invention, does not fall into the scope of the invention; they can be prepared by any procedure known in the art. A technically advantageous process for their preparation consists in air-oxidizing aldehydes, obtained, for instance, by the so-called oxo-process from olefins, produced by cracking or from polymeric olefins and reacting the carboxylic acids so obtained with secondary amines. The secondary amines may be produced by catalytic nitrilation of so-called oxo-alcohols with ammonia (for instance, in the presence of iron catalysts following the process according to British Patent 729,005, or U.S. Patent 2,805,243) and catalytic hydrogenation of the products obtained by the said nitrilation. The carboxylic acid amides used for the foregoing tests are obtained in such a manner.

Thus, there has been described a novel method for improving the physical properties and accelerating the gel time of mixtures of compounds containing epoxide groups and acid hardening agents, whereby a tertiary carboxylic acid amide, as described herein, is employed in said mixture.

What is claimed is:

1. A process for hardening compounds having epoxide groups which comprises reacting a liquid polyglycidyl ether of a polyhydric phenol with ±10% of the stoichiometrically necessary amount of a polycarboxylic acid anhydride as hardening agent and 0.1–20% by weight referred to said polyglycidyl ether of a tertiary carboxylic acid amide having the formula:

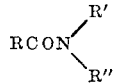

wherein each of R, R' and R" is an aliphatic hydrocarbon radical as accelerator.

2. Process according to claim 1 wherein said aliphatic hydrocarbon radicals contain from 4 to 18 carbon atoms.

3. Process according to claim 1 wherein said aliphatic hydrocarbon radicals contain from 4 to 13 carbon atoms.

4. Process according to claim 1 wherein said tertiary carboxylic acid amide is N,N-diisononyl-isobutyric acid amide.

5. Process according to claim 1 wherein said tertiary carboxylic acid amide is N,N-diisononyl-isooctanoic acid amide.

6. Process according to claim 1 wherein said tertiary carboxylic acid amide is N,N-diisononyl-isononanoic acid amide.

7. Process according to claim 1 wherein said tertiary carboxylic acid amide is N,N-diisononyl-isotridecanoic acid amide.

8. Process according to claim 1 which comprises effecting said reaction with 1–10% by weight referred to said polyhydric phenol of said tertiary carboxylic acid amide.

9. Process according to claim 1 which comprises effecting said reaction with 1–5% by weight referred to said polyhydric phenol of said tertiary carboxylic acid amide.

References Cited

UNITED STATES PATENTS 2,955,101  10/1960  Bruin et al. _____ 260—47

WILLIAM H. SHORT, *Primary Examiner.*

T. PERTILLA, *Assistant Examiner.*

U.S. Cl. X.R.

260—2